United States Patent [19]
Kessens et al.

[11] Patent Number: 5,554,902
[45] Date of Patent: Sep. 10, 1996

[54] LIGHTWEIGHT HIGH POWER ELECTROMOTIVE DEVICE AND METHOD FOR MAKING SAME

[75] Inventors: Norman J. Kessens, Blue Springs, Mo.; Douglas M. Bowen, Overland Park; James P. Ceule, Shawnee, both of Kans.; Milton W. Rice, Seattle, Wash.

[73] Assignee: Libby Corporation, Kansas City, Mo.

[21] Appl. No.: 138,242

[22] Filed: Oct. 15, 1993

[51] Int. Cl.⁶ ................................. H02K 1/12
[52] U.S. Cl. .............. 310/254; 310/42; 310/44; 310/156
[58] Field of Search ................ 310/254, 259, 310/44, 216, 217, 156, 42, 268, 179

[56] References Cited

U.S. PATENT DOCUMENTS

| | | | |
|---|---|---|---|
| 3,428,926 | 2/1969 | Bogner et al. | 350/54 |
| 3,891,875 | 6/1975 | Laskaris | 310/52 |
| 3,991,333 | 11/1976 | Laskaris | 350/52 |
| 4,048,529 | 9/1977 | Pomeroy et al. | 310/54 |
| 4,082,967 | 4/1978 | Laskaris | 310/64 |
| 4,278,905 | 7/1981 | Chari et al. | 350/52 |
| 4,291,997 | 9/1981 | Laskaris | 310/52 |
| 4,672,252 | 6/1987 | Spirk . | |
| 4,900,965 | 2/1990 | Fisher . | |
| 4,912,350 | 3/1990 | Parshall et al. | 310/217 |
| 4,924,198 | 5/1990 | Laskaris | 335/216 |
| 4,986,078 | 1/1991 | Laskaris | 335/216 |
| 5,034,713 | 7/1991 | Herd et al. | 335/216 |
| 5,097,163 | 3/1992 | Shah et al. . | |
| 5,212,419 | 5/1993 | Fisher et al. . | |
| 5,323,077 | 6/1994 | Brandes | 310/254 |

OTHER PUBLICATIONS

*Magnetics Update*, vol. 5, Issue 2, Spring 1993, pp. 1 and 4.
"Development of a Coolant Circuit for Rotors of Superconducting Generators", by P. A. Rios et al., submitted to Conference of Technical Applications of Superconductivity, Alushta, U.S.S.R., pp. 1–10, Sep. 16–19, 1975.
"Design Studies of Superconducting Generators", by S. H. Minnich et al., IEEE Transactions on Magnetics, vol. MAG–15, No. 1, pp. 703–709, Jan. 1979.
"Recent Progress of Development of 70MW Class Superconducting Generators", by N. Higuchi et al., IEEE Transactions on Applied Superconductivity, vol. 3, No. 1, pp. 369–372, Mar. 1993.
"Rotor Design of a 1000MW Superconducing Generator", by K. Yamaguchi et al., 88SM620-7, IEEE/PES 1988 Summer Meeting, Portland, OR, Jul. 24–29, 1988, pp. 1–6.

*Primary Examiner*—R. Skudy
*Attorney, Agent, or Firm*—Fried, Frank, Harris, Shriver & Jacobson

[57] ABSTRACT

A lightweight high power electromotive device and a method for making the same is provided. The method includes the step of laminating a plurality of stator sheets to provide a stator inductor with integrated stator bars, wherein the laminating includes the step of interleaving the sheets to provide a uniformly distributed grain orientation, The method eliminates the need to handle a large number of components during manufacturing and further eliminates the need to encapsulate the inductor with an epoxy,

9 Claims, 11 Drawing Sheets

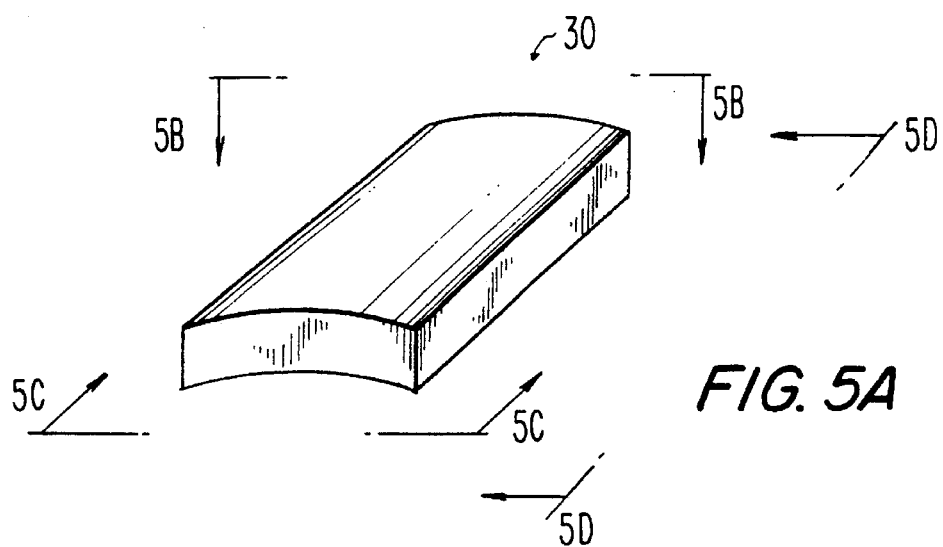
FIG. 5A
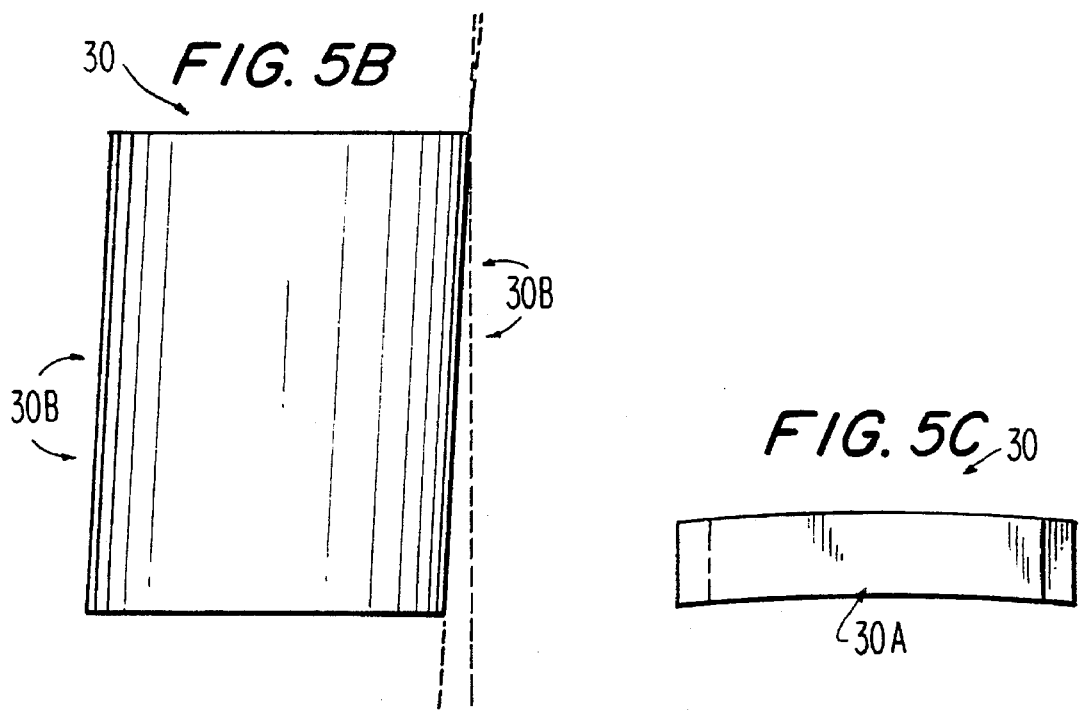
FIG. 5B
FIG. 5C
FIG. 5D

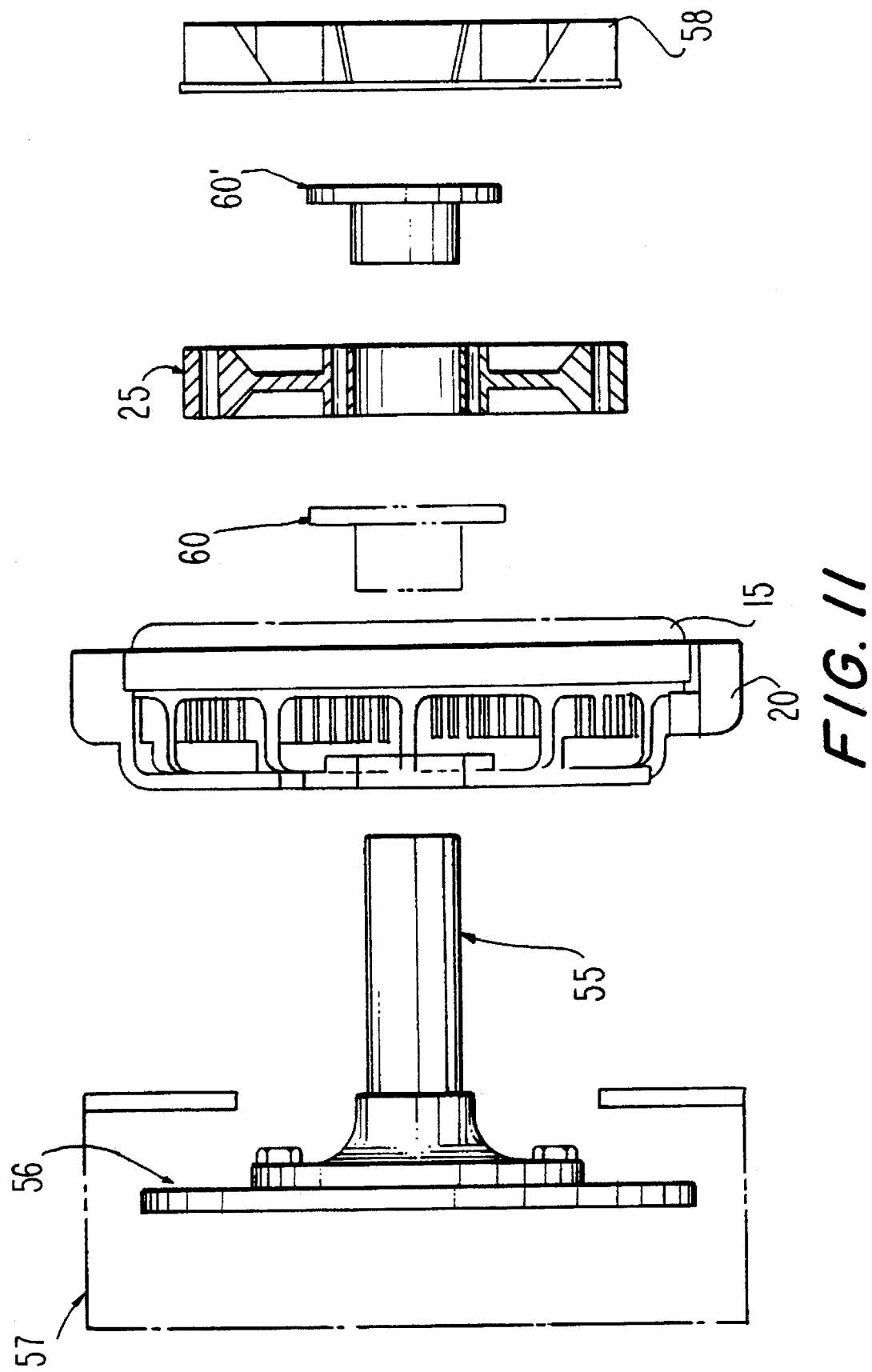

1

LIGHTWEIGHT HIGH POWER ELECTROMOTIVE DEVICE AND METHOD FOR MAKING SAME

BACKGROUND OF THE INVENTION

This invention relates to an electromotive device having a high power-to-weight ratio and being capable for use as a motor, alternator or generator. More particularly, this invention relates to a method for manufacturing such a device which reduces manufacturing complexity and associated manufacturing costs.

Recently, a new type of lightweight electromotive device has been developed which is capable of operating at high efficiency and speeds while maintaining high torque and power. Such devices are described in U.S. Pat. Nos. 4,900,965 and 5,212,419, which are hereby incorporated by reference in their entirety. These patents describe an electromotive device having a large diameter—thin cross section speculation ratio for reducing the weight of the device. The device also has low eddy currents and low opposing induced currents, which increase efficiency, torque and speed of operation.

The devices described in the above-incorporated '965 and '419 patents have low loss and high efficiency because of the incorporation of "I-shaped" stator bars. Such bars include a radially short thickness to reduce stator bar cross leakage. Moreover, losses associated with conductor windings being directly exposed to a magnetic field are also reduced due to the I-shaped bar providing a shield for the magnetic field. Additionally, losses caused by the oversaturation of the stator bars are reduced by designing the rotor to include an amount of permanent magnet material such that the bars would just approach saturation. Lastly, the stator bars are oriented such that their grain orientation is aligned with the magnetic field passing therethrough to further improve efficiency.

As described in the '419 Patent, the above electromotive device has heretofore been manufactured as follows. The I-shaped stator bars are individually stamped from a sheet of stator material and individually stacked together (i.e., laminated) by employing an adhesive such tape or glue prior to winding. The separate stacks of stator bars are then inserted into a special magnetic circular winding fixture which holds the various stacked bars against each other to avoid the formation of any air gaps between bars. After the individual stacks are placed in the fixture, coils of electrical conductors are wound around the stator bars to form the stator assembly. The complete stator assembly is then encapsulated or potted with an epoxy-type resin to fixedly hold the stacks of stator bars in a unitary structure with the stator coils. Such encapsulation is achieved either through vacuum impregnation, dipping, brushing or centrifugal application. The final step of the process includes a high temperature processing step to cure the resin.

Although the electromotive device formed according to the above process provides a device capable of operating at high efficiency and having a high power-to-weight ratio, such a device suffers from a number of drawbacks.

First, the device requires a large number of I-shaped stator bar segments to be individually stamped, handled and stacked during manufacturing. This process can be tedious and expensive. Moreover, manufacturing is further complicated since the individual stacks must be positioned tight against each other to avoid the formation of air gaps between stacks.

Second, in some device configurations, the stacks must be oriented a few degrees from the axis of rotation (e.g., two to six) to reduce any cogging effects. Such spacing and orientation constraints also complicates winding of the bars—which generally must be done by hand in order to maintain proper positioning and orientation among the stacks for high efficiency operation.

Third, the device requires an ,encapsulation step which employs an epoxy-type material to hold the individual stator bars and electrical conductors together to form the stator inductor. Because of such epoxy, the resulting device can suffer from thermal and mechanical degradation. For example, after many hours of operation, the epoxy-encapsulated stator assembly may develope cracks or other defects which can allow moisture to penetrate the epoxy, which may lower the breakdown voltage of the stator. This can result in further degradation of the stator, reducing power output and efficiency of the device. Moreover, the development of cracks in the epoxy could cause the stator to become warped and out of round and, therefore, result in interference between the rotor and stator—further reducing power efficiency and structural integrity of the device.

In light of the above, it would be desirable to be able to provide an improved method of manufacturing a high power-to-weight ratio electromotive device which simplifies manufacturing and reduces associated manufacturing costs.

It would also be desirable to be able to provide such an electromotive device which is less susceptible to thermal and mechanical degradation after extended operation due to the use of material.

SUMMARY OF THE INVENTION

It is an object of this invention to provide an improved method of manufacturing a high power-to-weight ratio electromotive device which simplifies manufacturing and reduces associated manufacturing costs.

It is also an object of this invention to provide such an electromotive device which is less susceptible to thermal and mechanical degradation after extended operation due to the use of material.

In accordance with this invention there is provided a high power-to-weight ratio electromotive device including: (1) a stator assembly having a plurality of magnetic flux conducting integrated stator bars formed from a plurality of laminated sheets and each having electrical conductor windings disposed adjacent said bars for creating an electromagnetic field, wherein the stator bars have a geometry which shield the windings from the magnetic field and wherein each lamination sheet forms a part of at least two adjacent stator bars having at least a portion of said sheet with a longitudinal grain orientation; and (2) means adjacent said inductor for generating a magnetic field within said electromotive device. The present invention also includes a method for aligning a stator and rotor to an engine shaft and flywheel.

There is also provided a method of manufacturing a lightweight high-power electromotive device. The method includes the steps of: (a) forming integrated sheets of stator material having at least two spaced-apart regions on each for shielding an adjacent electrical conductor from a magnetic field, at least one of said regions having a longitudinal grain orientation; (b) laminating said integrated sheets to provide a stator inductor with a integrated stator bars, wherein said laminating includes the step of interleaving said sheets to provide a uniformly distributed grain orientation; and (c) winding electrical conductors around said stator bars.

3

BRIEF DESCRIPTION OF THE DRAWINGS

The above and other objects and advantages of the invention will be apparent upon consideration of the following detailed description, taken in conjunction with the accompanying drawings, in which like-reference numerals refer to like-parts throughout, and in which:

FIG. 5A is a perspective view of the rotor permanent magnet of the electromotive device of FIG. 1;

FIGS. 5B—5D are top, front and side plan views of the rotor permanent magnet of FIG. 5A, taken from lines 5B—5B, 5C—5C and 5D—5D, respectively, of FIG. 5A;

FIG. 11 is an exploded assembly view illustrating the method of the present invention for aligning and mounting a stator and rotor to an engine shaft and flywheel.

DETAILED DESCRIPTION OF THE INVENTION

The electromotive device of the present invention can be used as a motor, alternator or generator in either linear, curvilinear or circular configurations. The device includes a stator formed by interleaving laminated sheets of stator material. The laminated sheets include a plurality of integrated "T-shaped" regions, having a particularly oriented grain structure, for forming stator bars after a plurality of such regions are stacked and aligned on top of each other. As discussed below, the integrated nature of the laminated sheets simplifies the manufacturing process by reducing the amount of material handling and eliminating the need for an epoxy-based stator inductor encapsulant. Because of the "T-shape," the stator bars shield adjacent electrical conductor windings from magnetic fields, thus improving device efficiency at high speeds and power.

FIGS. 1–6 illustrate a rotary embodiment of the electromotive device of the present invention. Device 10 (FIG. 1) includes stator core 15 (FIGS. 2A–2C) mounted in stator housing 20 (FIG. 3A and 3B). Rotor 25 (FIGS. 4A and 4B) includes a plurality of permanent magnets 30 (FIGS. 5A–5D) for generating the magnetic field to be rotated across coils of wire 35 (shown in FIG. 6 but not FIG. 1 for clarity) wound around stator bars (see below).

Figure 1:
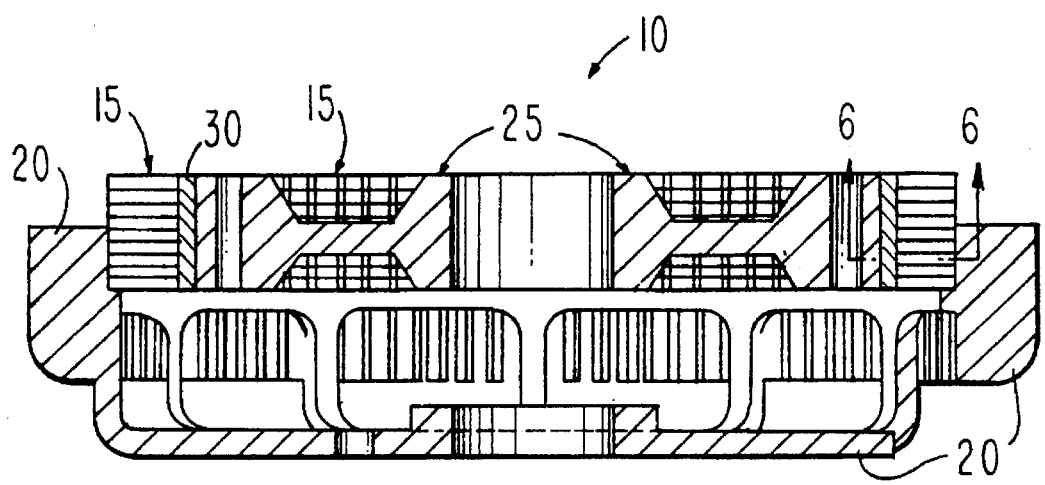
FIG. 1 is a side sectional view of a rotary embodiment of the electromotive device of the present invention.
Figure 2C:
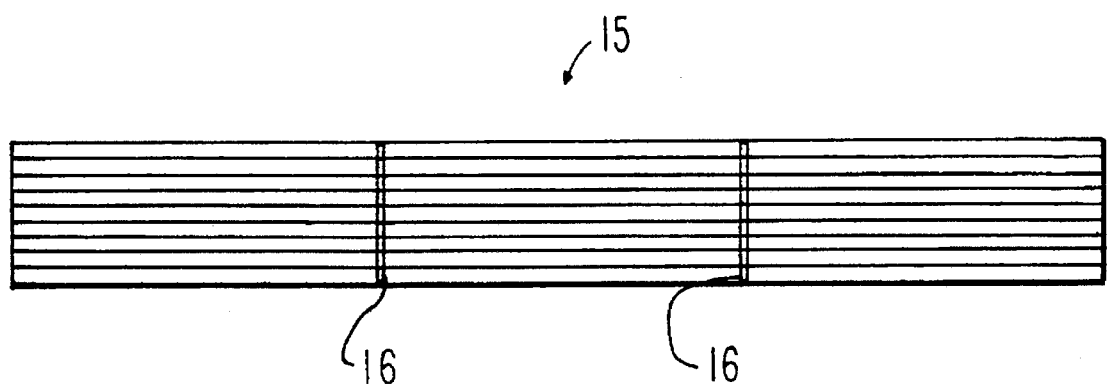
FIG. 2C is a side plan view of the stator core of FIG. 2A, taken from line 2C—2C of FIG. 2A.
Figure 2A:
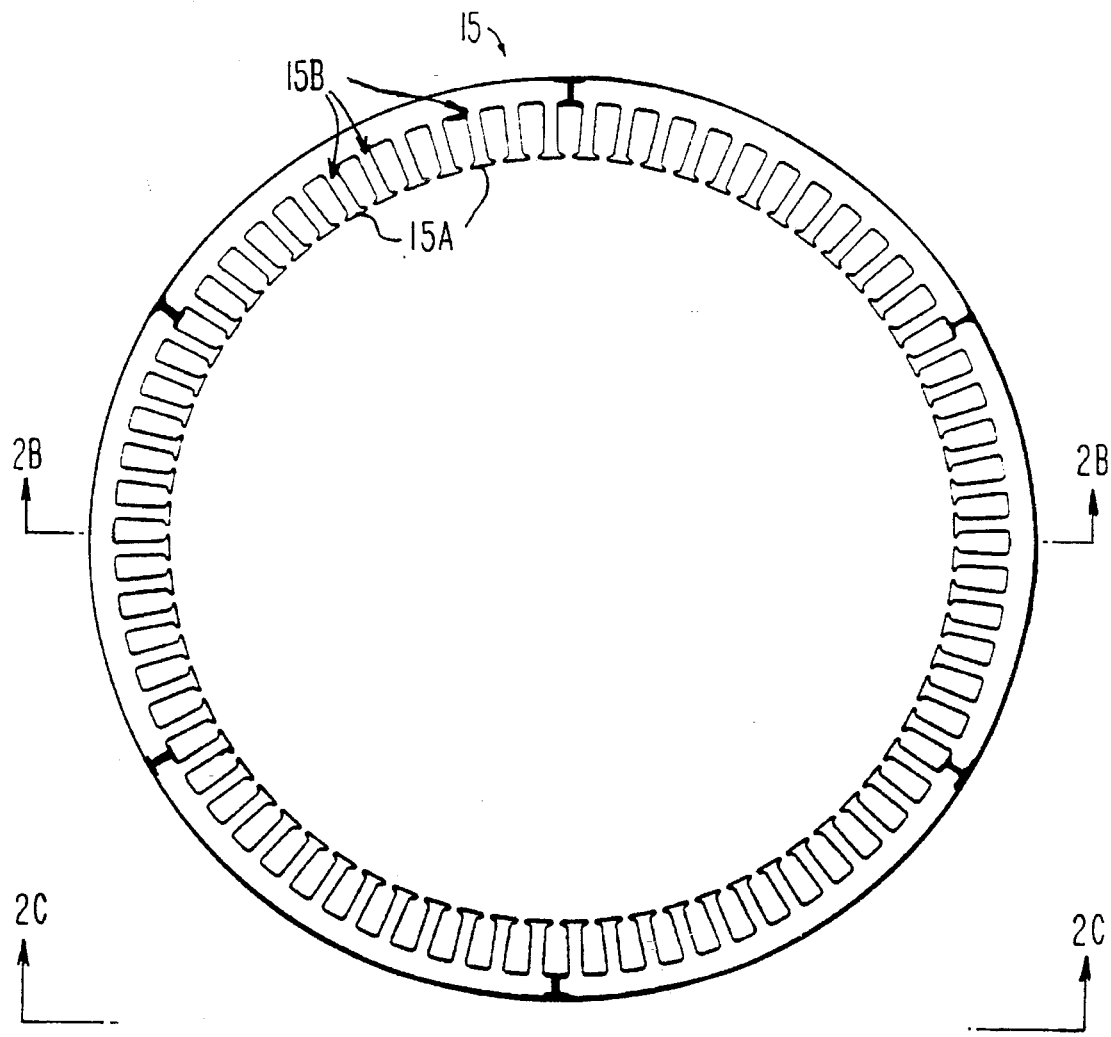
FIG. 2A is a plan view of the stator core of the electromotive device of FIG. 1.
Figure 2B:
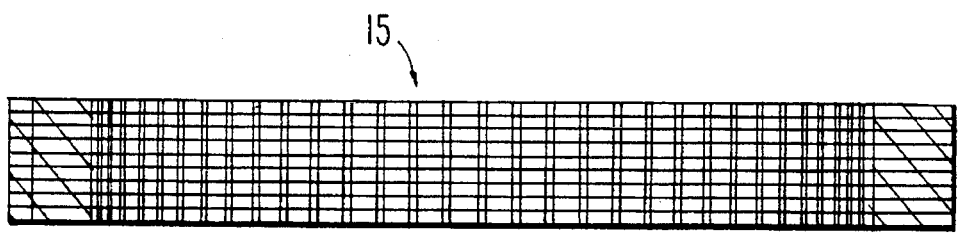
FIG. 2B is a cross-sectional view of the stator core of FIG. 2A, taken from line 2B—2B of FIG. 2A.

As shown in FIGS. 2A–2C, stator core 15 includes a plurality of laminated and integrated "T-shaped" stator bar segments 15A (to be discussed in more detail below) attached to each other at their base 15B. Segments 15A are geometrically shaped to facilitate shielding of electrical conductors wound around the stator bars.

Figure 3A:
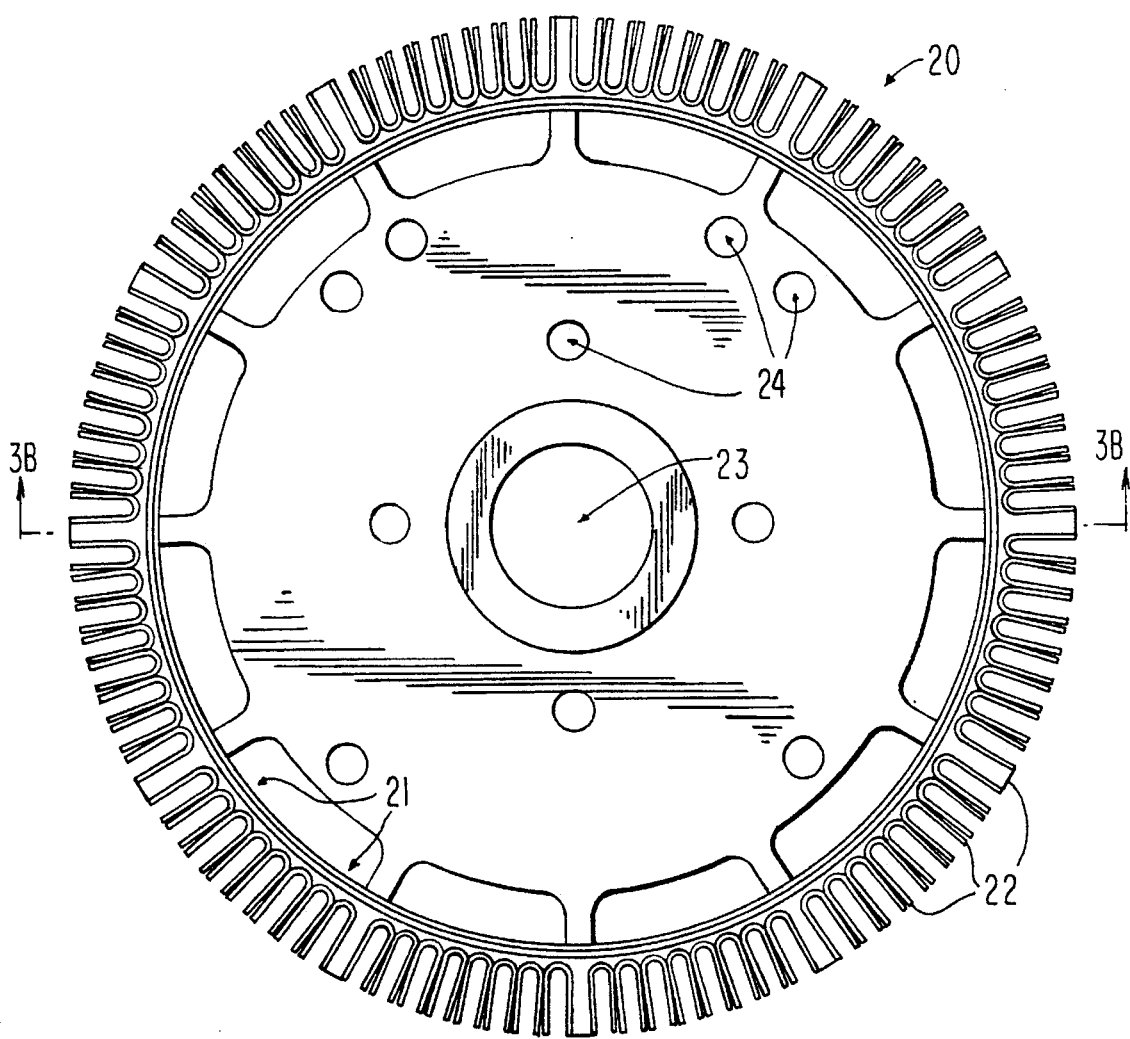
FIG. 3A is a top plan view of the stator housing of the electromotive device of FIG. 1.
Figure 3B:
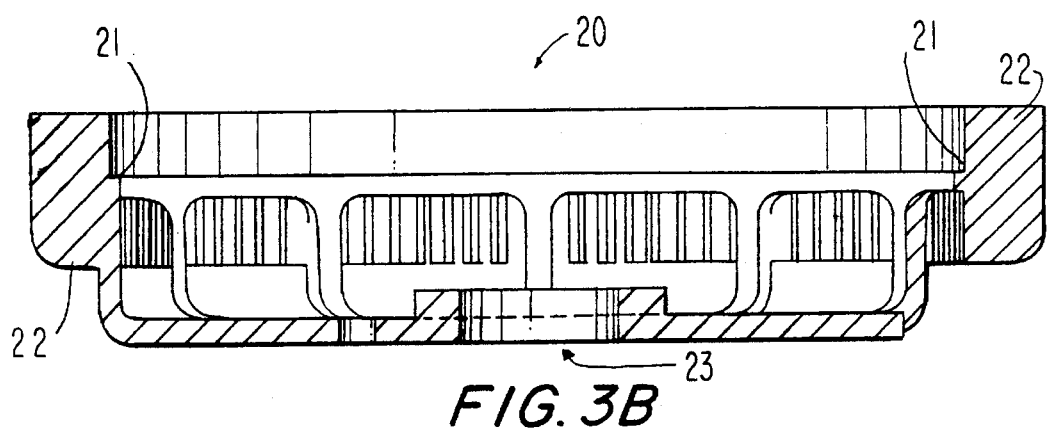
FIG. 3B is a sectional view of the stator housing of FIG. 3A, taken from line 3B—3B of FIG. 3A.

As shown in FIGS. 3A and 3B, stator housing 20 includes a recess 21 for placement of stator core 15. Fins 22 are used to facilitate heat dissipation and to provide air flow contours for cooling the device during operation. Opening 23 is adapted to allow an engine shaft to pass therethrough (not shown). Holes 24 are used to fixedly mount stator housing 20 to an engine housing.

Figure 4A:
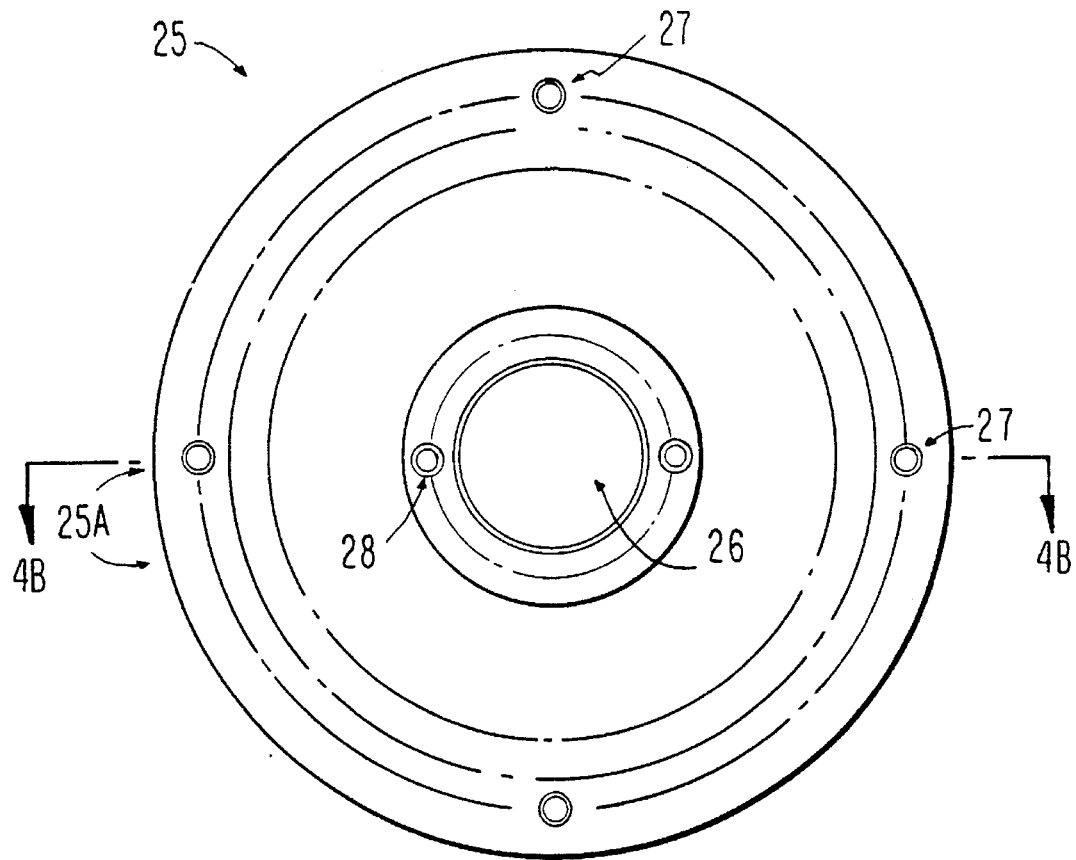
FIG. 4A is a top plan view of the rotor (without permanent magnets) of the electromotive device of FIG. 1.
Figure 4B:
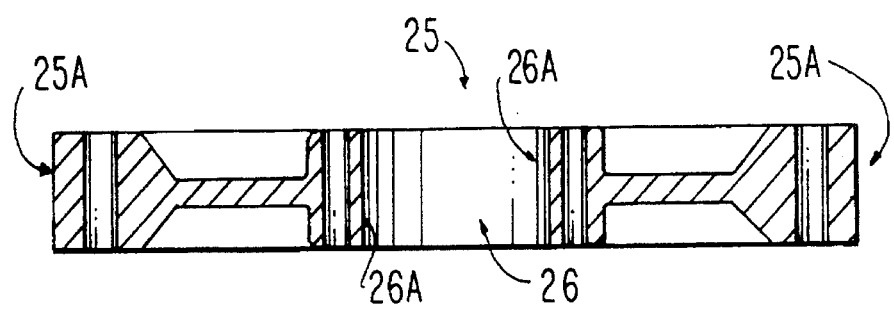
FIG. 4B is a sectional view of the rotor of FIG. 4A, taken from line 4B—4B of FIG. 4A.
Figure 6:
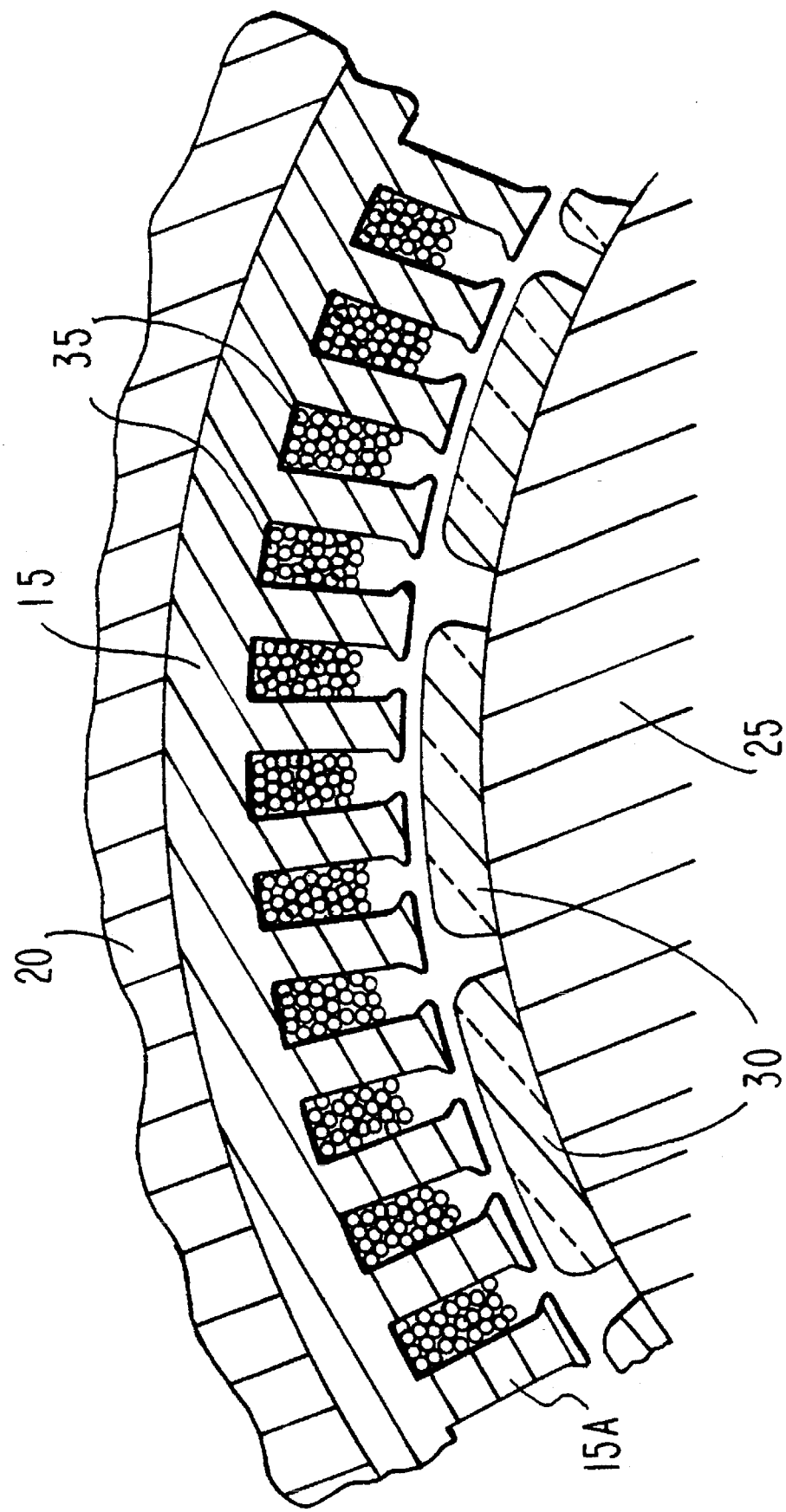
FIG. 6 is a detailed cross-sectional view of the electromotive device of FIG. 1, taken from region 6—6 of FIG. 1.

As shown in FIGS. 4A and 4B, rotor 25 is of an integrated design for ease of manufacturing and includes an outer surface 25A for placement of permanent rotor magnets. Although shown as an integrated one-piece unit in FIGS. 4A and 4B, a multi-piece integrated design could be used. As illustrated, opening 26 has tapered walls 26A adapted for fixedly attaching to an engine shaft through the use of a split taper bushing (to be discussed below). Threaded holes 28 are used to facilitate such attaching. Threaded holes 27 are adapted to allow for attachment of a fan (not shown) to facilitate cooling.

As shown in FIGS. 5A–5D, rotor permanent magnets 30 include a curved surface 30A adapted to, be fixedly attached to rotor surface 25A (FIGS. 4A and 4B). As discussed below, magnet 30 also includes two sides 30B which are oriented a few degrees theta (e.g., two to six) from the rotational axis of the device to facilitate rotation. As discussed below, inclusion of the angled sides on magnet 30, instead of angling the stator bars of stator 15, simplifies manufacturing.

In the present embodiment permanent magnets 30 are preferably formed of neodymium boron ferrite (NdFeB), but they may be formed of barium ferrite ceramic (BaFe Ceramic), samarium cobalt (SmCo), or the like. Of course, if desired, magnets 30 could be replaced with electromagnets or other magnetic field generators.

In accordance with the present: invention, stator core 15 shown in FIGS. 2A–2C is of an integrated construction and does not require the use of an adhesive to hold a stator bar together or epoxy to encapsulate the stator inductor after conductor winding. This feature of the present invention is illustrated by FIGS. 7A and 7B, which compare the stator bars of the present invention to those of the prior art.

Figure 7A:
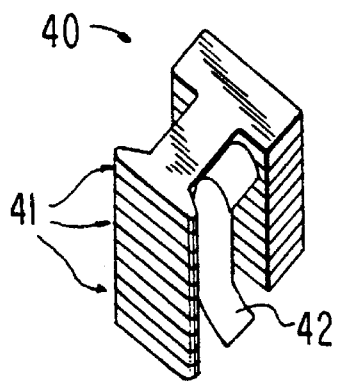
FIG. 7A illustrates the prior art stack of I-shaped stator bars requiring adhesive tape or other bonding agents for handling.

As shown in FIG. 7A, the prior art stator bar stack 40 is constructed out of a plurality of individually stamped and stacked I-shaped segments 41 of stator material. Tape 42 is used to hold such segments together while stack 40 is being inserted into a magnetic winding fixture (not shown) to facilitate conductor winding and, if desired, to provide conductor insulation.

Figure 7B:
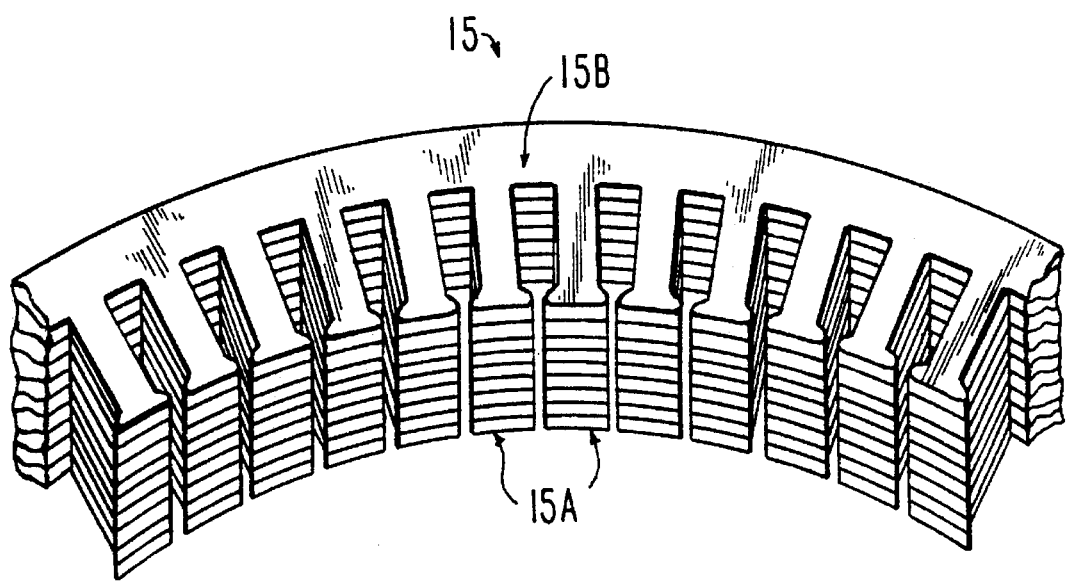
FIG. 7B illustrates an embodiment of the stack of integrated T-shaped stator bars in accordance with the present invention.

FIG. 7B illustrates an embodiment of stator bars assembled in accordance with the principles of the present invention. Because adjacent stator bars 15A are physically connected together at regions 15B (as a result of being stamped simultaneously out of a sheet of stator material, e.g., silicon iron), adhesive tape or other bonding agents are no longer needed to facilitate handling of the stator bars during conductor winding. In addition, manufacturing is further simplified since a spacing between adjacent bars does not have to be precisely maintained during manufacturing—the integrated stator bars of the present invention are inherently self-aligned as a result of the stamping process. (As discussed below, the integrated stator bars of the present invention can be assembled by "interleaving" the lamination stack).

Figure 8A:
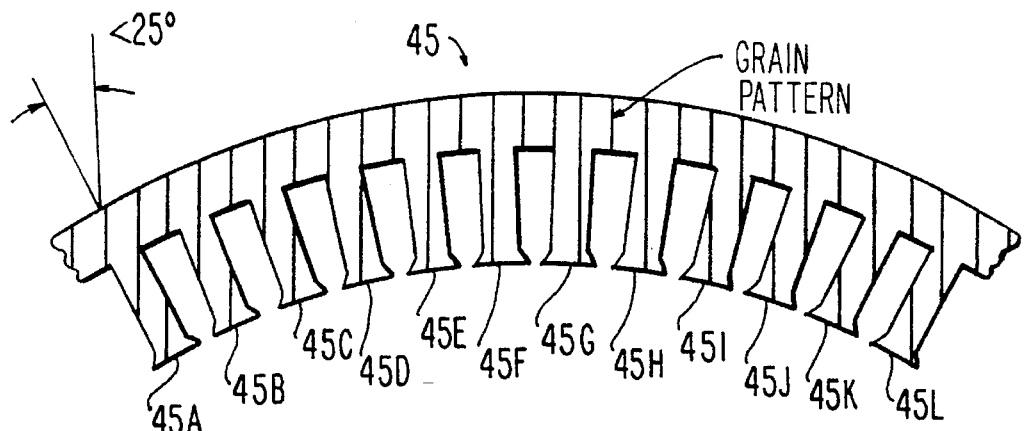
FIG. 8A illustrates a single lamination stamping of controlled grain ferrous metal in accordance with the present invention.

A further feature of the stator assembly of the present invention is that the grain direction of the stator bars can be controlled and oriented in a preferred direction for providing high device efficiency. This feature is illustrated by FIG. 8A which shows a single lamination stamping 45 (with twelve integrated stator bar segments 45A–45L) having a controlled grain orientation in accordance with the present invention. As shown, for four of the twelve segments (45E–45H), the grain direction is substantially aligned to the primary flux path through the stator bars (i.e., radially). For the remaining eight segments (45A–45D and 45I–45L), the grain direction is misoriented from the radial direction by less than about twenty-five degrees. In comparison to a randomly oriented grain pattern, this reduces heat generation because of the reduced level of resistance to magnetic flux. A random grain pattern provides maximum resistance which leads to maximum heat generation, whereas a uniform and oriented pattern reduces resistance and therefore heat.

Figure 8B:
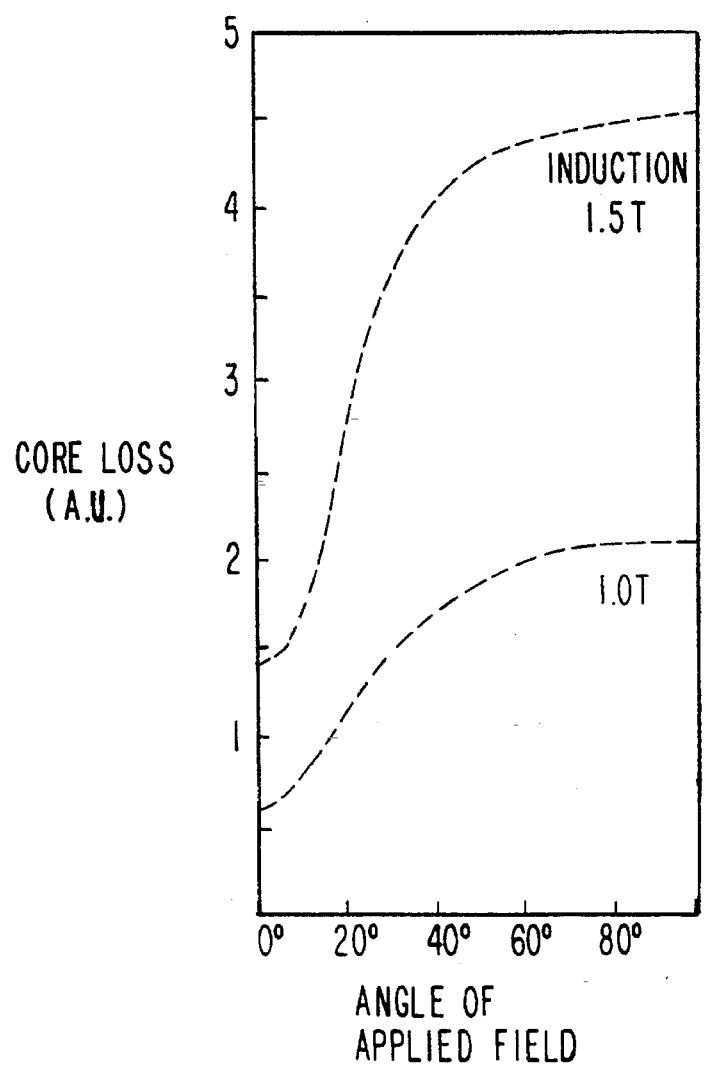
FIG. 8B qualitatively illustrates the dependance of core loss as a function of the angle of applied magnetic field (relative to the grain orientation direction) and induction field strength for a typical grain-oriented electrical steel.

The inventors herein have found that high efficiency can be achieved using the stamp pattern shown in FIG. 8A even though the grain orientation is not precisely radially aligned for each and every stator bar segment 45A–45L. The inventors believe this is attributed to the substantial alignment of the grain orientation in the radial direction. For example, FIG. 8B qualitatively illustrates the dependance of core loss (in arbitrary units) as a function of the angle of applied magnetic field (relative to the grain orientation direction) and induction field strength (1.0 and 1.5 T) for a typical grain-oriented electrical steel (AISI type M-6 oriented silicon steel). As shown in FIG. 8B, as long as the angle of the applied field is less than about twenty to thirty degrees, core loss is still relatively low compared to field angles in excess of thirty to forty degrees—resulting in improved efficiency for such field angles.

Figure 8C:
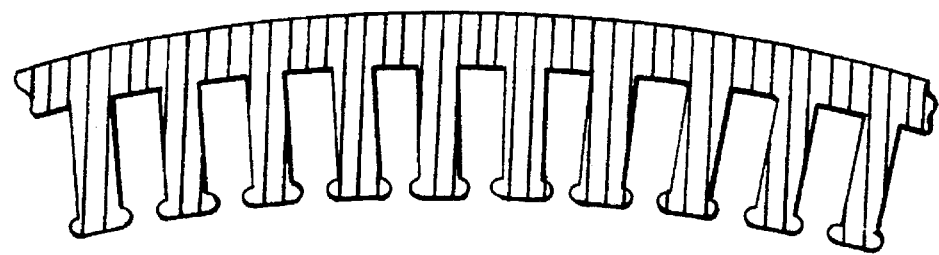
FIG. 8C and 8D illustrate the effect of stator diameter on the grain orientation in the stator of the present invention.
Figure 8D:
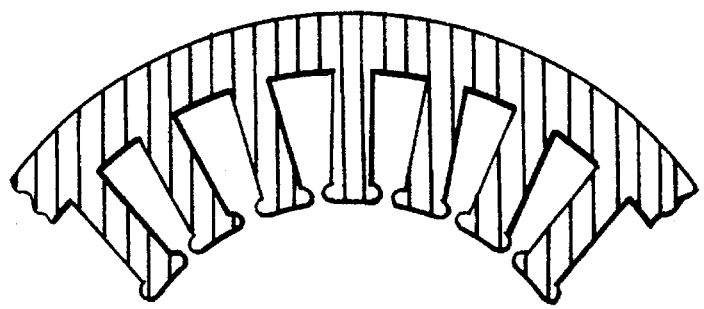

FIGS. 8C and 8D illustrate the effect of stator diameter on the alignment of grain orientation in the stator bars of the present invention. As shown in FIG. 8C, the larger the diameter, the closer the alignment of the grain direction to the radial direction (more preferred). As shown in FIG. 8D, the smaller the diameter, the larger the number of stator bars with misaligned grain directions (less preferred).

Figure 8E:
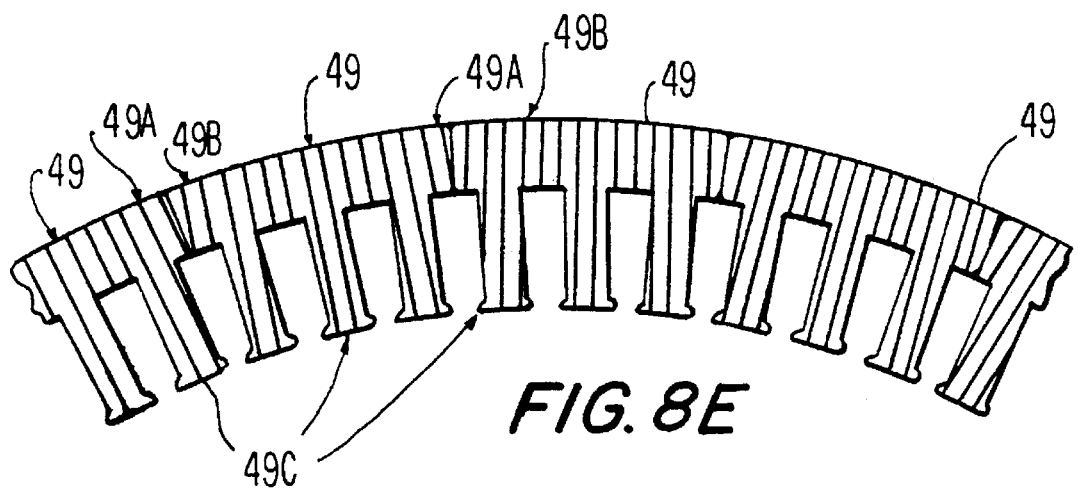
FIG. 8E illustrates the effect of circumferential length on the grain orientation in the stator of the present invention.

FIG. 8E illustrates the effect of decreasing the number of segments per stamping pattern. (i.e., the number per unit circumference). As shown, when a stator is formed with a three-segment stamping pattern (i,e., segments 49 having ends 49A and 49B), each and every bar 49C will have a grain orientation that is substantially aligned with the radial direction.

Figure 9:
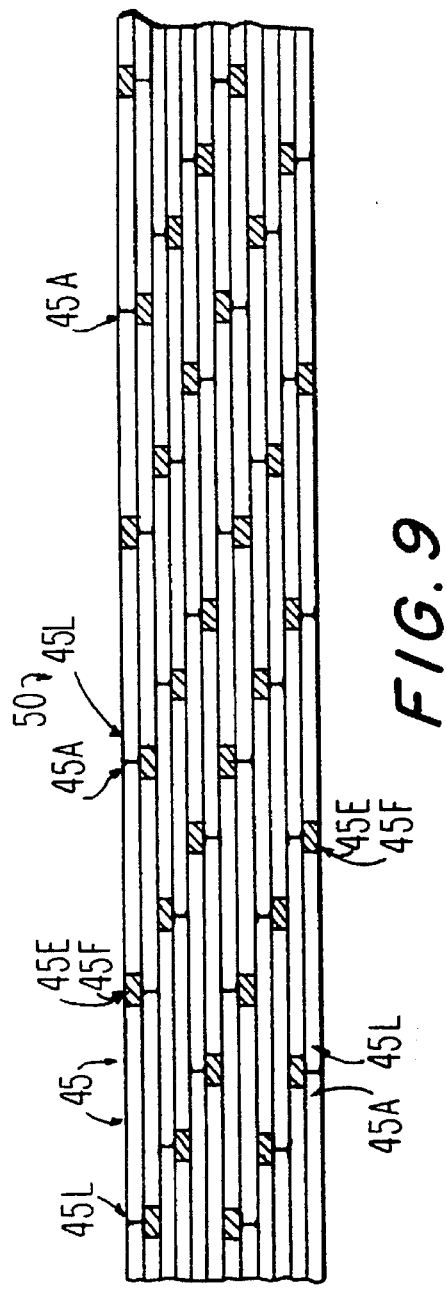
FIG. 9 illustrates interleaving of the integrated T-shaped stator bars in accordance with the present invention.

The present invention also includes a method of stacking the laminated sheets of stator material to provide a more uniformly distributed grain orientation throughout the stator bars. FIG. 9 illustrates a stacking pattern for forming stator bars from twelve-segment sheets of stator material. As illustrated, stack 50 (shown in cross section) includes sheets 45 having end segments 45A and 45L, with slightly misaligned grain directions (see FIG. 8A) and segments 45F and 45G, with aligned grain directions (see FIG. 8A). By interleaving the laminations of the stator assembly during manufacturing as shown in FIG. 9, each resulting stator bar will have a more uniform mix of grain orientations to provide high efficiency.

In accordance with the present invention, the interleaved lamination stack of the stator can be held together by welding, fusing or other similar techniques, preferably along the outside surface of the stator (see weld lines 16 in FIG. 2C). This eliminates the need for adhesive tape or other bonding agents as used previously in prior art stators (see FIG. 7A). After welding, the integrated stator bar structure can be wound with electrical conductors. Because the stator bars are inherently rigidly spaced from each other, such winding can be accomplished without the need for mounting the stator in a separate magnetic fixture as required for prior art stators. This can also facilitate winding of the stator by automatic winding machines. Moreover, as discussed above, an epoxy encapsulation material is also not needed to hold the stator together after winding. This can reduce thermal and mechanical degradation of the stator after extensive operation due to the development of cracks and other defects in the epoxy (which can allow moisture to penetrate the stator and lower the voltage breakdown point or cause the rotor to become out of round), thus improving the long-term reliability and efficiency of the device.

The present invention also provides a method of manufacturing an electromotive device having improved rotation performance. FIG. 10A illustrates the prior art device wherein rotor 25' includes permanent magnet 30A which sweeps across stator bars 40. Stator bars 40 are generally oriented phi degrees (e.g., two to six) from the axis of rotation to facilitate start-up of the device. Such orienting of stator bars 40 complicates manufacturing since the orientation angle must be maintained during conductor winding. For example, because stator bars 40 are not self-aligned, each stator bar must be individually aligned during winding. Additionally, the angle must be carefully maintained until the epoxy encapsulation is cured.

Figure 10B:
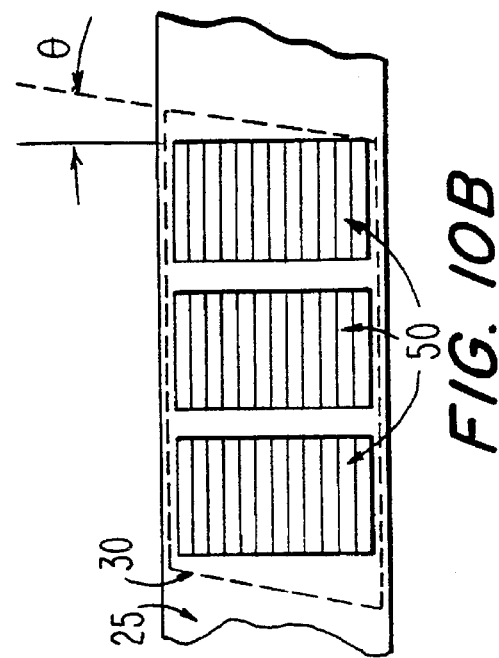
FIG. 10B illustrates the method of orienting the rotor permanent magnets a few degrees from the rotation axis in order to facilitate start-up of the electromotive device in accordance with the present invention.
Figure 10A:
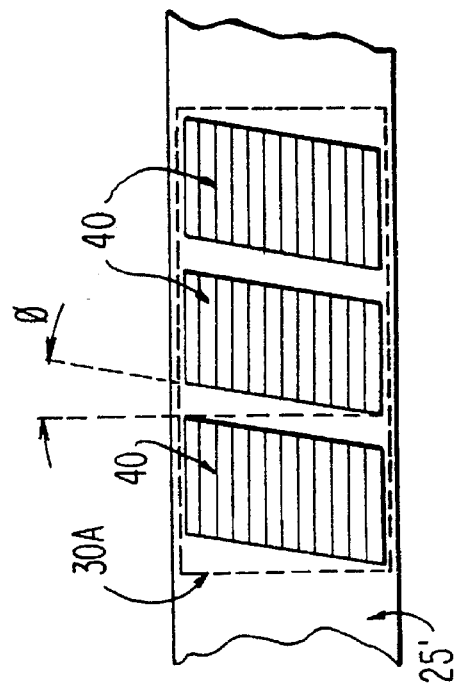
FIG. 10A illustrates the prior art method of orienting the stack of stator bars a few degrees from the rotation axis in order to facilitate start-up of the electromotive device.

FIG. 10B illustrates an improved device constructed in accordance with the principles of the present invention. As shown, instead of orienting the stator bars a few degrees from the axis of rotation—which complicates manufacturing—, the rotor permanent magnets 30 are oriented instead (see FIGS. 5A–5D). This simplifies manufacturing of the stator since only right-angled stator bars are involved therein.

In accordance with the present invention, there is also provided a method for aligning the stator and rotor of the present invention to an engine shaft or engine flywheel stub shaft. This feature of the present invention is illustrated by FIG. 11, which is an exploded assembly view showing the use of an alignment bushing to first align the stator and then align the rotor of the present invention. As illustrated, alignment bushing 60 (available from, e.g., Browning Mfg. Division, Emerson Electric Co., Maysville, Ky.—"Split Taper Bushing Type H") is first used to locate stator 15 concentric to engine shaft 55, after which stator 15 is fixedly mounted to housing 57. Thereafter, bushing 60 is removed from shaft 55 while rotor 25 is placed thereon. Bushing 60' (which is the same as bushing 60) is then used again to locate and mount rotor 25 concentric to stator 15 and engine shaft 55. Bushing 60' is used to permanently hold rotor 25 in place. Fan 58 is attached to rotor 25 (on either side-thereto) either before or after the rotor is mounted. In accordance with the present invention, bushing 60 is thus used for two purposes: (1) to align stator 15 to engine shaft 55 and mount stator 55 on housing 57 and (2) to align and mount rotor 25 to the same shaft. Bushing 60 is thus used in accordance with the present invention to hold the stator and rotor concentric to each other and to the engine shaft during mounting to ensure precise and rapid alignment of the components.

The alignment method illustrated by FIG. 11 eliminates the need to manually align the stator and rotor to the engine shaft using a mechanical measurement technique (e.g., mylar shims placed around rotor 25 to align it relative to stator 15) or other trial and error techniques. Such alignment previously was time consuming. The method of the present invention simplifies the manufacturing process and, thus, reduces associated manufacturing cost.

Thus, a method for manufacturing a light-weight high-power electromotive device has been provided. One skilled in the art will appreciate that the present invention can be practiced by other an the described embodiments, which are presented here for purposes of illustration and not of limitation, and that the present invention is limited only by the claims it follows.

What is claimed is:

1. An electromotive device comprising:

a stator assembly having a plurality of magnetic flux conducting integrated stator bars formed from a plurality of separate but interleaved laminated sheets and each having electrical conductor windings disposed adjacent said integrated stator bars for creating an electromagnetic field, wherein each laminated sheet includes a plurality of T-shaped regions for forming the integrated stator bars, said plurality of T-shaped regions being of two types, a first type having an aligned longitudinal grain orientation and a second type having a misalignment longitudinal grain orientation wherein the misalignment in said second type is still small enough to reduce heat generation in comparison to a randomly oriented grain orientation; and means adjacent the stator assembly for generating a magnetic field within said electromotive device;

whereby the integrated stator bars are self-aligning because each individual T-shaped region does not need to be individually stacked and aligned relative to each other during manufacturing of the device.

2. The electromotive device of claim 1, wherein the stator assembly is fixed with respect to a housing enclosing the electromotive device and said magnetic field generating means includes a plurality of magnets fixed to a rotor positioned proximate to the stator assembly for rotation about an axis central to said rotor and said stator assembly.

3. The electromotive device of claim 2, wherein said magnetic field generating means includes a plurality of permanent magnets fixed to said rotor.

4. The electromotive device of claim 3, wherein said permanent magnets are oriented slightly away from the axis central to said rotor and said stator assembly to facilitate rotational operation of the device and the integrated stator bars are oriented parallel to the axis central to said rotor and said stator assembly, whereby manufacturing of the device is simplified.

5. The device of claim 4, wherein the magnets are oriented from about two to about six degrees from the axis central to said rotor and said stator assembly.

6. The electromotive device of claim 2, wherein said magnetic field generating means includes a plurality of electromagnets fixed to said rotor.

7. The electromotive device of claim 1, wherein said separate but interleaved laminated sheets form a part of at least three but less than fifteen integrated stator bars.

8. The electromotive device of claim 7, wherein said separate but interleaved laminated sheets form a part of twelve integrated stator bars.

9. The electromotive device of claim 1, wherein said separate but interleaved laminated sheets are welded together.

* * * * *